United States Patent
Brambilla et al.

(10) Patent No.: US 10,807,510 B2
(45) Date of Patent: Oct. 20, 2020

(54) DEVICE FOR LOADING AND UNLOADING GOODS

(71) Applicant: Brambo Services, Paderno Dugnano (IT)

(72) Inventors: Simone Brambilla, Paderno Dugnano (IT); Dario Colzani, Paderno Dugnano (IT)

(73) Assignee: BRAMBO SERVICES, Paderno Dugnano (MI) (IT)

( * ) Notice: Subject to any disclaimer, the term of this patent is extended or adjusted under 35 U.S.C. 154(b) by 126 days.

(21) Appl. No.: 16/141,061

(22) Filed: Sep. 25, 2018

(65) Prior Publication Data
US 2020/0094724 A1 Mar. 26, 2020

(51) Int. Cl.
*B60P 1/02* (2006.01)
*B60P 1/64* (2006.01)

(52) U.S. Cl.
CPC .............. *B60P 1/02* (2013.01); *B60P 1/6427* (2013.01); *B60P 1/6436* (2013.01)

(58) Field of Classification Search
CPC ......... B60P 1/3436; B60P 1/6427; B60P 1/02; B60P 1/64; B60P 1/6436; B66F 9/00
USPC ................................................. 414/111, 498
See application file for complete search history.

(56) References Cited

U.S. PATENT DOCUMENTS

| 3,176,853 A | 4/1965 | Baudhuin | |
|---|---|---|---|
| 3,348,711 A * | 10/1967 | Gove | B60P 1/6445 414/459 |
| 3,707,238 A * | 12/1972 | Thibodeau, Sr. | B60P 1/025 414/458 |
| 3,784,054 A * | 1/1974 | Mautz | B60P 1/6427 220/534 |
| 3,788,500 A * | 1/1974 | Lemelson | B60P 1/6427 414/792.8 |
| 9,856,120 B2 * | 1/2018 | Kim | B66C 1/30 |
| 10,384,871 B2 * | 8/2019 | Zuckerman | B65G 1/0414 |
| 2003/0180132 A1 | 9/2003 | Morreim | |
| 2019/0389651 A1 * | 12/2019 | Grabmeier | B65D 90/0026 |

FOREIGN PATENT DOCUMENTS

| DE | 102005050893 A1 | 4/2007 |
|---|---|---|
| EP | 2823995 A1 | 1/2015 |
| EP | 3348502 A1 | 7/2018 |
| JP | H02282197 A | 11/1990 |
| WO | 2015155189 A1 | 10/2015 |

* cited by examiner

*Primary Examiner* — Mark C Hageman
(74) *Attorney, Agent, or Firm* — Lucas & Mercanti, LLP

(57) ABSTRACT

Loading and unloading device configured for connection to a truck or a trailer of truck, having a main support frame, a support frame supported in a position adjustable by the main frame and a cradle supported in a position adjustable by the main frame and defining with it a goods storage compartment, and means for handling the secondary frame and the cradle with respect to the main frame along one or more directions of second axes X, Y, Z which are orthogonal to modify the configuration of the compartment.

12 Claims, 8 Drawing Sheets

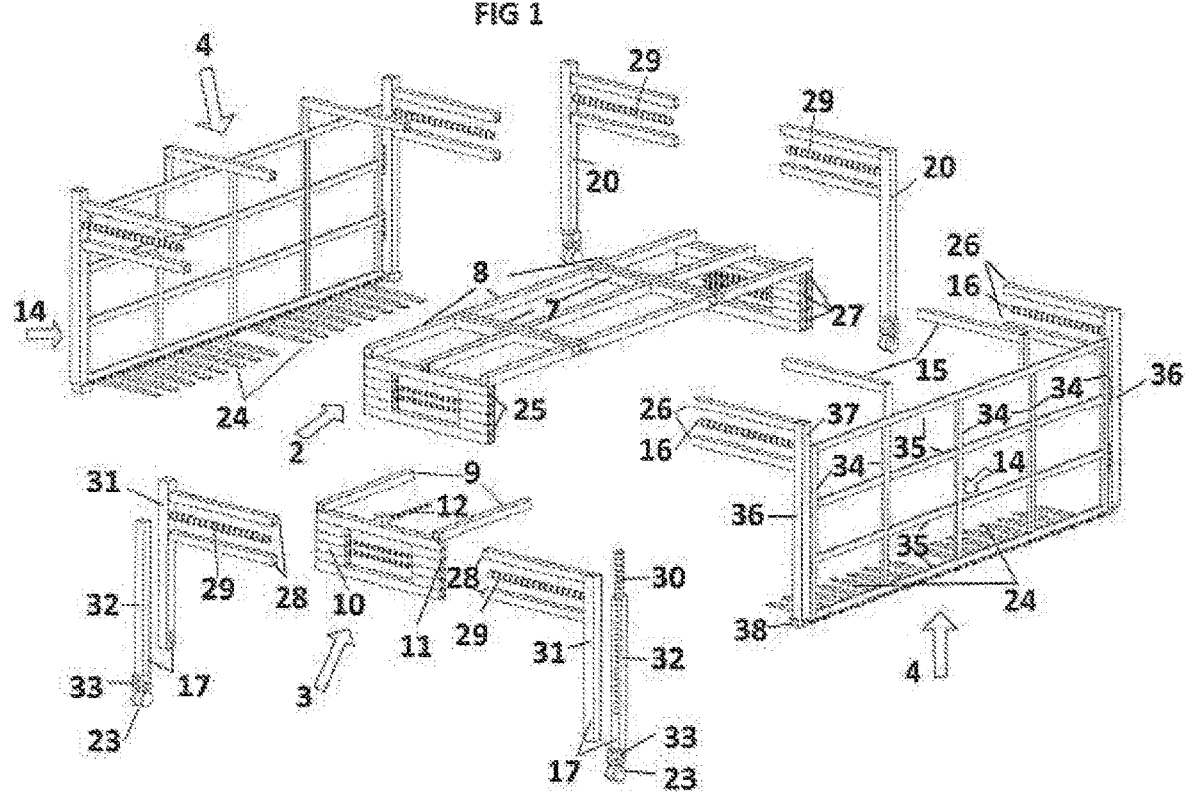

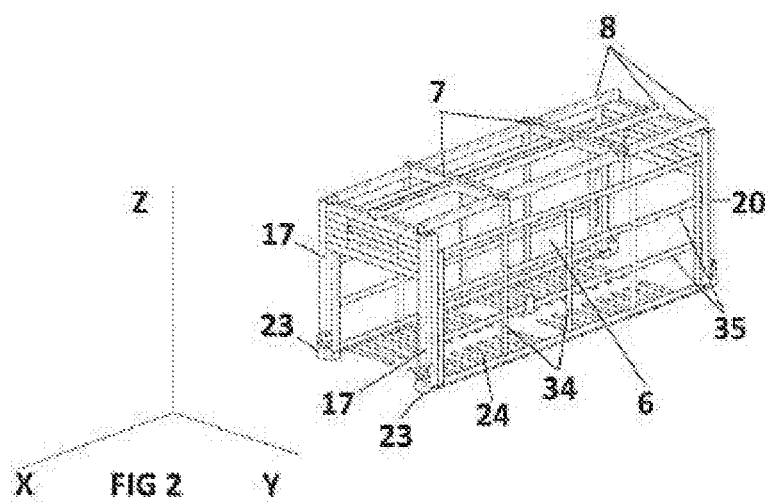

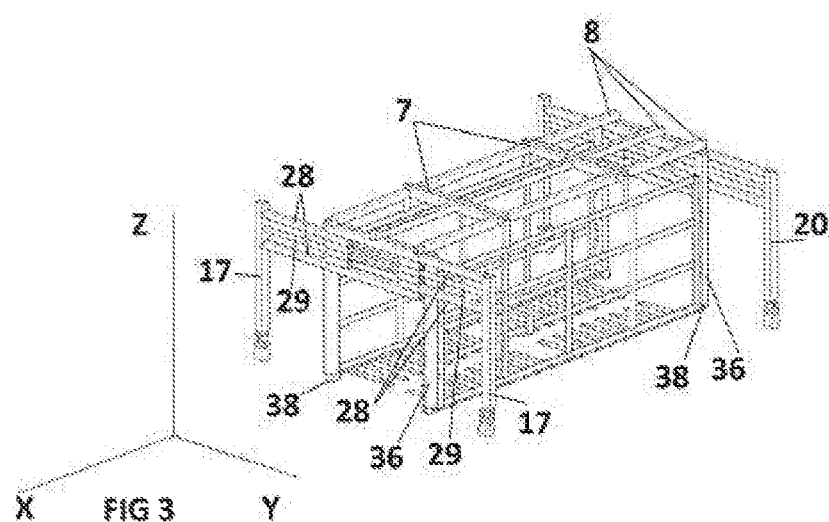

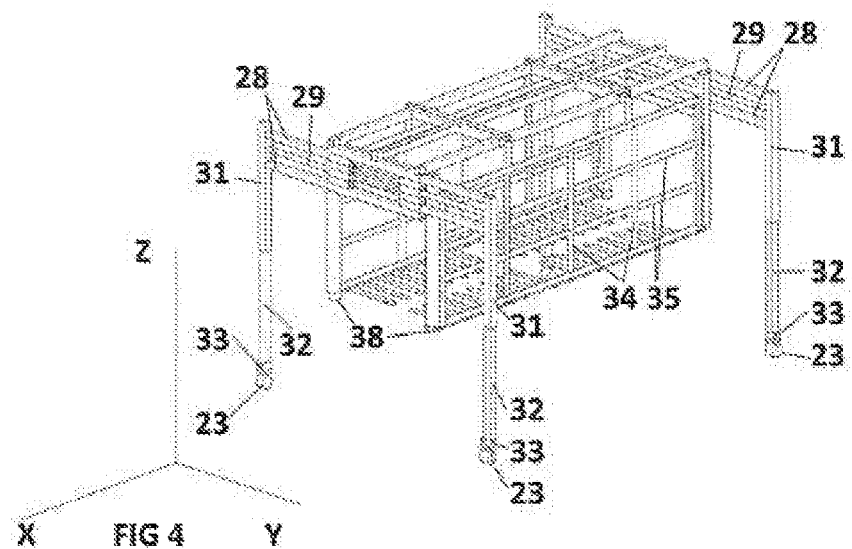

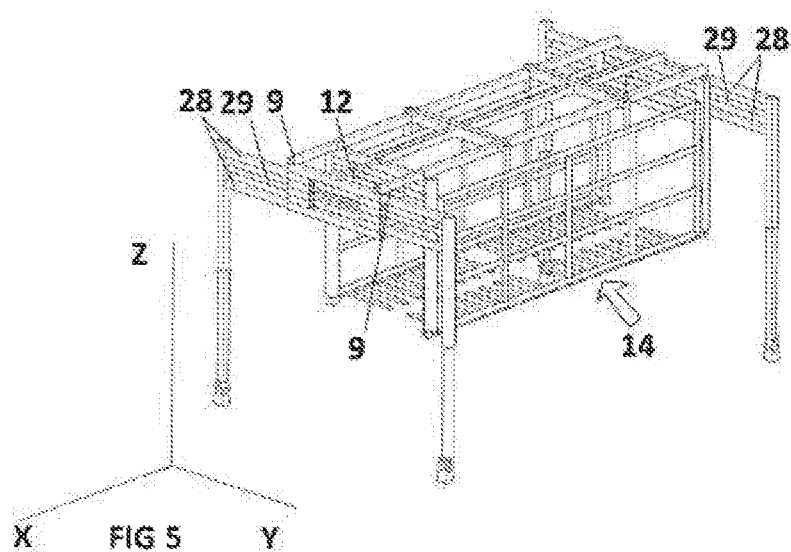

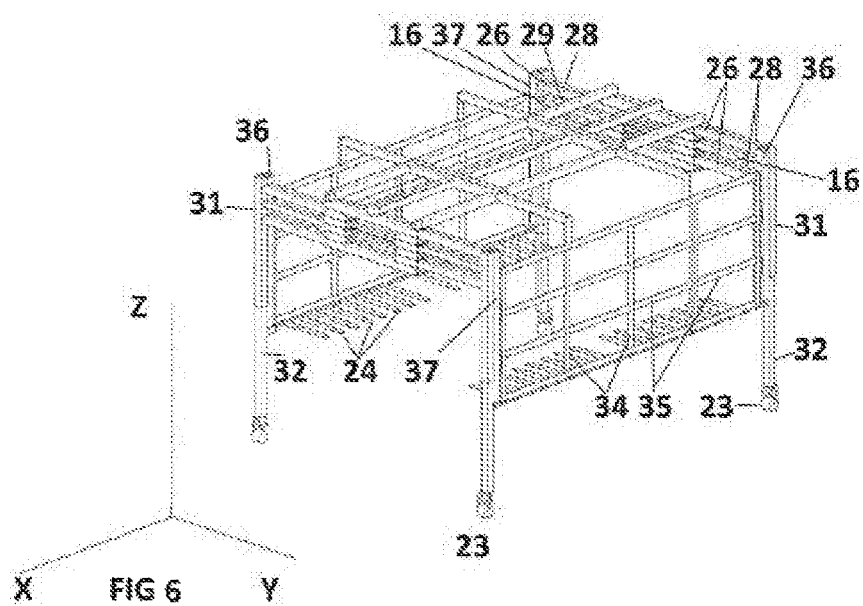

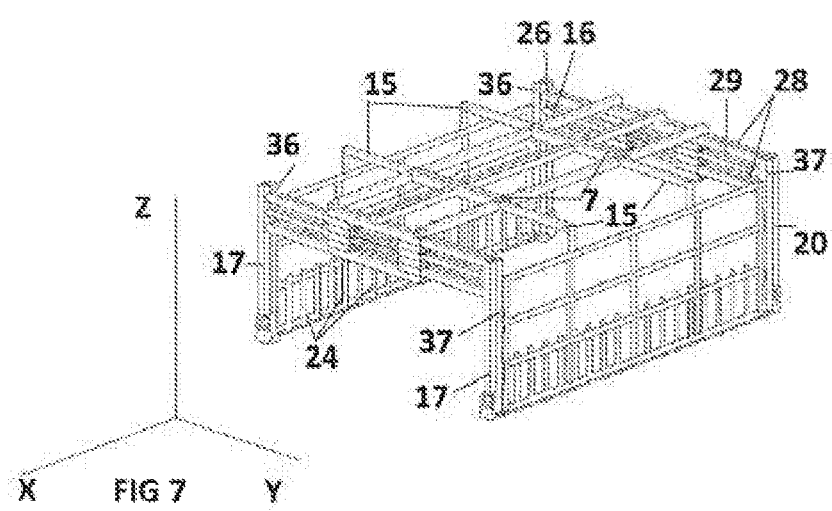

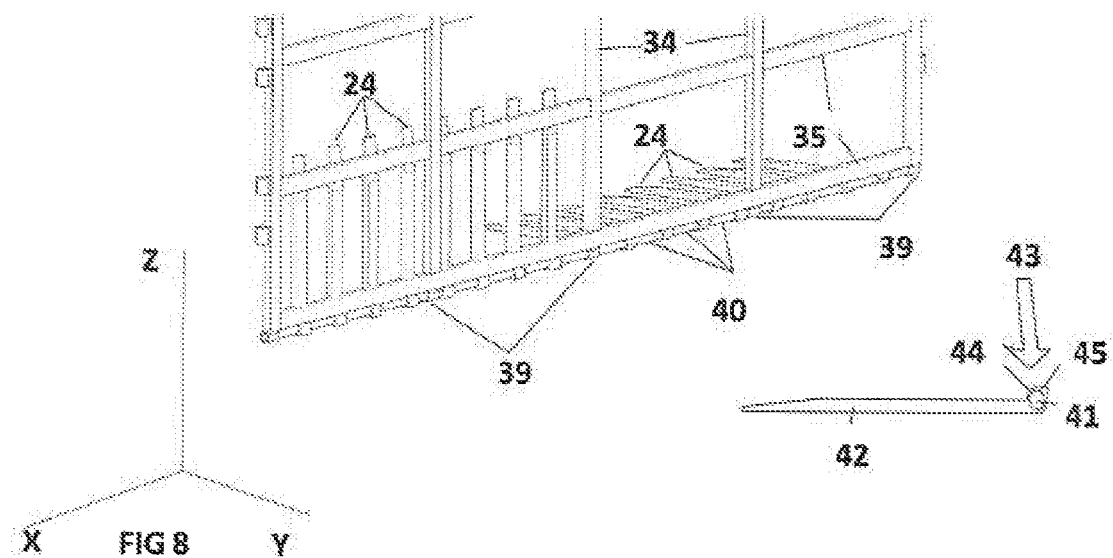

DEVICE FOR LOADING AND UNLOADING GOODS

FIELD OF INVENTION

The present invention relates to a device for loading and unloading goods configured for connection to a truck or trailer of a truck.

BACKGROUND OF THE INVENTION

In general loading and unloading of vehicles and their trailers occurs through devices that provide for the human intervention that must deal with the handling of goods.

In fact, all current known solutions allow only the handling of the goods in the trailer and/or container. The current market solutions provide for the following alternative solutions:

Truck or fixed trailer. Loading and unloading takes place via external devices (forklifts, trans-pallets). The trailer remains stationary for the duration of the operation.

Container. Loading and unloading takes place in the container by means of external devices. The trailer is free. The container remains stationary for the duration of the operation.

Trailer with scraper box. Loading and unloading is carried out by way of external devices. The chassis is discharged from the trailer for ease of operation. The box remains stationary for the duration of the operation.

When the truck, the trailer and/or container is brought to the loading and unloading point, as mentioned above, an employee has to load or unload the goods by way of forklifts or trans-pallets or, in case of containers, usually he will need to use suitable lifting devices (for example a crane) for placing the container on the ground in such a way that the unloading and loading employee can enter and do his job and then reuse the crane to lodge back the container on the truck.

From patent application US2003/0180132 A it is known a mobile lift or device adapted for adjusting its width, length and height.

However, this device is only configured for moving goods on the ground and not for loading and unloading goods on vehicles.

In case the mobile device needs to be transported, it is provided that the device is unloaded and, then, disassembled for being shipped, for instance, inside a container.

It is clear that current techniques and devices for unloading and loading goods have considerable disadvantages.

First of all, the long operating times and therefore the costs that will need to discharge the whole truck, trailer and/or container.

Additionally, for instance, the cost of renting a suitable lifting device to position the container on the ground and then lodge it back on the truck.

Finally, the complication associated with the organization of different subjects to be coordinated in loading and unloading; it's requested a specialist who has got the requirements to manoeuvre a heavy lifting vehicle and specialists who know how to use forklifts and trans-pallets.

SUMMARY OF THE INVENTION

The main problem that the invention seeks to solve is the coordination between the loading and unloading specialists and the trucker.

At present, both of them must be present at the same time, as it's not allowed for trucker to load/-unload independently and it's impossible to handle the goods without the presence of the vehicle.

The solution according to present invention releases the two operators.

Part of the work can then be done before or after the trucker presence.

The technical task of the invention is to provide a loading and unloading device that can be removably connected, at least when loaded, to a floor of the truck, trailer and/or container for the automated handling of the truck, trailer and/or container so as to reduce operating times.

Another object of the invention is to provide a loading and unloading device which allows loading and unloading of goods directly without the need for direct support of manual means (forklifts, trans-pallets, cranes).

A further object of the present invention is to provide a loading and unloading device which limits the human intervention.

One final purpose is to facilitate and speed up the locking and stabilizing of the load. The cradle encloses and blocks the goods, for instance, to the floor avoiding the need for anchoring it through ropes or wire ropes.

Load dispersion is more difficult.

The technical task as well as these and other objects of the present invention are achieved by providing a device for loading and unloading goods configured for connection to a floor of a truck or trailer, comprising a main support frame, a secondary frame supported in a position adjustable as regards said main frame, a cradle supported in a position adjustable as regards said main frame and defining with it a goods storage compartment, and means for moving said secondary frame and said cradle relative to said main frame along one or more directions according to X, Y, Z axes orthogonal each other to modify the configuration of said compartment.

The movement means comprise one or more linear actuators.

In particular, the main frame comprises a first set of supporting bars and a second set of supporting bars perpendicular to each other.

Preferably, the secondary frame comprises supports slidingly coupled to said second set of supporting bars.

More particularly, the secondary frame comprises a front portion having a stacked and welded tubular structure.

One or more linear actuators adjust the size along the Y axis of said front portion relative to said main frame.

Preferably, the cradle comprises lateral walls defining said compartment and supports of said side walls slidingly coupled to said first set of supporting bars of said main frame.

Preferably, at least two of said linear actuators adjust the size along the Y axis of said side walls with respect to said main frame.

The loading and unloading device comprises main support legs having an adjustable length along the Z axis and an adjustable position along the X and Y axes.

Preferably, each of said legs is respectively supported by a wheel.

Preferably, the legs are moved by each of at least one of said linear actuators.

Preferably, the cradle comprises elements for supporting the goods, each one hinged to a corresponding side wall.

BRIEF DESCRIPTION OF DRAWINGS

The features and advantages of the invention will be best understood by way of the detailed description of the tests and the results, with reference to the attached drawings in which:

FIG. 1 shows a cutaway view of the various components of the device.

FIG. 2 shows a perspective view of the loading and unloading device in closed configuration with the forks in horizontal position.

FIG. 3 shows a perspective view of the loading and unloading device after the movement along the Y axis of the main legs.

FIG. 4 shows a perspective view of the loading and unloading device after the movement along the Y and Z axes of the main legs.

FIG. 5 shows a perspective view of the loading and unloading device after moving along the X-axis of the secondary frame.

FIG. 6 shows a perspective view of the loading and unloading device after moving along the Y axis of the cradle.

FIG. 7 shows a perspective view of the loading and unloading device after moving along the Z-axis of the main legs.

FIG. 8 shows a detail of the possible configuration with forks.

DETAILED DESCRIPTION OF THE INVENTION

With reference to the aforesaid figures, a device 1 for loading and unloading goods is shown configured for connection to a floor of a truck or truck trailer.

The loading and unloading device 1 according to the present invention comprises a main support frame 2, a secondary frame or sub-frame 3, a cradle 4, and movement means for moving the secondary frame 3 and the cradle 4 with respect to the main frame 2 along one or more directions according to X, Y, Z axes orthogonal to each other.

In particular with reference, for instance, to the trailer floor, the X axis is a horizontal axis oriented in the direction of the trailer length, the Y axis is a horizontal axis oriented in the direction of the trailer width, and the Z axis is a vertical axis oriented in the direction of the trailer height.

The secondary frame 3 and the cradle 4 are supported by the main frame 2.

In particular, the cradle 4 defines, together with the main frame 2, a goods storage compartment 6.

The main support frame 2 guarantees the structure and support of all other structures that fit on the frame itself.

In particular, the main frame 2 comprises a first set of supporting bars 7, in particular square tubes extending along the direction of the Y axis and a second set of supporting bars 8, in particular square tubes, perpendicular to said first set of supporting bars 7, extending along the X axis.

The first set of supporting bars 7 of the main frame 2 comprises two tubes each comprising a double section bar.

The first set 7 and the second set of supporting bars 8 have the dual purpose of creating the structure of the main frame 2 and allowing the installation:

of the secondary frame 3, whose supports 9, shaped in particular as square tubes, are slidingly and telescopically paired to the second set of supporting bars 8.

of the cradle 4 whose supports 15, shaped in particular as square tubes, are slidingly and telescopically paired to the first set of supporting bars 7.

The main frame 2 further comprises a frame of horizontal square tubes 25 in the front side. These tubes are stacked and welded. This allows the installation and sliding of the cradle supporting legs, through the supports 26. Movement and sliding are permitted by actuators 16. The sliding occurs along the direction of Y axis.

The main frame 2 further comprises a frame of horizontal square tubes 27 similar to the frame of the front square tubes 25 but double by number of tubes.

This allows installation and sliding of:

secondary legs 36, supporting the cradle 4, synchronized with the movement of the front side standing on the frame of front square tubes 25, said sliding occurring along the direction of the Y axis;

main legs 20 through the supports 28. Movement and sliding are provided through the actuators 29, said sliding occurring along the direction of the Y axis.

Both square tube frames 25 and 27 have a low profile (height of only 6 stacked tubes) to allow a greater size of the central opening and an easier handling for loading and unloading goods.

The goods loading and unloading device 1 also comprises main supporting legs 17, 20. In particular, the device comprises two main legs 17 positioned frontally to the right and to the left of the secondary frame 3 and two main legs 20 respectively positioned in the rear side to the right and to the left of the main frame 2.

The main frame 2 also allows the installation and sliding of the secondary frame 3.

As a matter of fact, the secondary frame 3 comprises supports 9 slidingly coupled to the second set of supporting bars 8 of the main frame 2.

Movement and sliding of the secondary frame 3 with respect to the main frame 2 along the direction of the X axis are provided through actuator 12.

The secondary frame 3 further comprises a front portion 10 comprising a frame of horizontal square tubes 11. This frame 11 is quite similar to the tube frame 25 in the main frame 2.

The tubular frame 11 allows the installation and sliding of the main legs 17 through the supports 28. Movement and sliding are provided via actuators 29. The sliding is carried along the direction of Y axis.

Advantageously movement means preferably comprise one or more linear actuators 12, 16, 29, 30.

In particular, the actuator 12 allows the movement along the X axis of the secondary frame 3 with respect to the main frame 2, enabling the change of the distance between the front legs 17 and the rear legs 20 and a consequent movement "forward and backward".

Actuators 29, however, allow the movement of the main legs 17, 20 with respect to the secondary frame 3 and to the main frame 2 along the Y axis for modifying the distance between the right legs and the left legs. This allows crab movement and stabilization of the device by increasing the bearing area on the ground.

The actuators 30 allow the movement of the main legs 17, 20 along the Z axis to modify the total height of the device and the resulting load height from the base.

The actuators 16 allow the cradle 4 to move with respect to the main frame 2 along the Y axis for modifying the opening existing between the two lateral walls 14 and consequently for adjusting the size of the goods storage compartment 6.

In particular, actuators 12, 16, 29, 30 may have different lengths.

The main legs 17, 20 allow the movement of the device 1 along one or more directions according to the X, Y, Z axes.

Each leg 17, 20 comprises a supporting structure 31 to which the supports 28 are associated, which extend their length along the Y axis.

The supports 28 allow for support, installation and sliding within the frame of square tubes 27 of the main frame 2 and within the frame of square tubes 10 11 of the secondary frame 3.

Each actuator 29 is positioned on each main leg 17, 20 in a median position between the two supports 28 and allows the movement of the main legs 17, 20 along the Y axis.

Inside the supporting structure 31 is inserted a sliding element 32, in particular a square tube telescopically coupled to the supporting structure 31.

The movement of the sliding element 32 with respect to the supporting structure 31 is ensured by the presence of the actuator 30 which permits the extension along the Z axis of the legs, thus effectively lifting the whole device 1 with respect to the supporting plane XY.

A corner block 33 is provided at the base of the sliding element 32, which allows that connection devices, for instance twist-lock type devices be removably locked to the truck or trailer floor.

Each leg 17, 20 is supported by a wheel 23 which allows the movement of the device along the X axis and also along the Y axis as well, by rotating the wheels.

Wheels 23 can be locked by way of various mechanisms such as brakes or cylinders.

The main part of the device 1 is the cradle 4 which carries the true function of loading and unloading goods.

Cradle 4 comprises lateral walls 14 delimiting the goods storage compartment 6 and the supports 15 of the lateral walls 14 sliding coupled to the first set of supporting bars 7 of the main frame 2.

Movement of the supports 15 along the Y axis within the supporting bars 7 is ensured by the presence of the actuators 16.

The actuators 16 allow the movement of the cradle 4 along the Y axis by increasing or decreasing the distance existing between the two lateral or side walls 14 and consequently increasing or decreasing the size of the goods storage compartment 6.

Each side wall 14 of the cradle 4 comprises vertical and horizontal support elements 34 welded together to create a vertical wall.

According to a preferred embodiment of the invention, the side wall 14 may be opened as described in this document, or according to another embodiment of the invention, the side wall 14 can be completely closed by way of panels installed therein.

Advantageously cradle 4 comprises two parts 24 hinged each to a corresponding side wall 14, and arranged for supporting the goods from below.

Cradle 4 may have various configurations (open or closed walls, support for goods through loading platforms or forks) but operation is similar.

Each side wall 14 of the cradle 4 comprises:
secondary legs 36;
horizontal supports 15 of the cradle 4 configured to be slidingly and telescopically inserted within the second set of supporting bars 7 of the main frame 2;
vertical and horizontal support elements 34, 35;
elements 24 for supporting the goods from below;
supports 39 of the elements 24.

Each secondary leg 36 comprises a vertical supporting structure 37 at which the supports 26 are associated, which extend their length along the Y-axis direction.

The supports 26 allow for support, installation and sliding within the square tube frames 25 and 27.

The actuators 16 are positioned on each secondary leg 36 in a median position between the two supports 26.

Each actuator 16 is respectively constrained within the frames 25 and 27 of the main frame 2 and allows the movement of the secondary legs 36 along the direction of the Y axis.

Advantageously at the base of each secondary leg 36 it is installed a corner block 38, which allows the removable locking of twist-lock devices thereto even when the device 1 is loaded with goods.

The corner blocks 38 allow the entire structure to be tied to the truck or trailer floor.

At the base of the structure of the side walls 14, which are attached to the lower horizontal support element 35, there are more supports 39.

These supports 39 allow the installation of the elements 24 for supporting the goods from below, for instance, from the base or the bottom.

In this configuration, the supports 39 comprise a circular hole in which one or more round bars 40 are inserted which are arranged to constrain the goods support elements 24 to the lateral walls 14 in a rotatable manner.

The structure of the side walls 14 of the cradle 4 is supported by the secondary legs 36 and the supports 15 of the cradle 4 to which it is constrained by way of welds and/or hinges.

The movement of the entire structure of the cradle 4 is ensured thanks to the presence of the actuators 16.

As a matter of fact actuators 16 allow the movement of side walls 14 along the direction of Y axis by increasing or decreasing the existing distance between the two lateral walls 14 and by consequently modifying the dimensions of the goods storage compartment 6.

Goods support elements 24 will vary depending on the configuration (pallet transport or bulk material).

In all configurations, the support elements 24 are however constrained to the side walls 14 by means of the lower horizontal support element 35.

According to a preferred embodiment of the invention, the goods support elements 24 comprise a variable number of forks, each hinged at the base of the side wall 14.

FIG. 8 shows in detail the configuration with the forks.

Forks can be moved or rotated to a horizontal (goods support) or vertical (goods release) configuration as a function of needs.

This movement can affect all the forks at the same time or just some of them (as shown in FIG. 8).

Movement can also be manual or automatic depending on the configuration required.

Each Fork comprises a load support section 42 and a section 43 arranged to be connected to the frame of the cradle 4.

Section 43 in particular comprises a circular hole 41 arranged to grant rotation of section 43 around its axis and to grant sliding of the section 43 along the bars 40 in the direction of the X axis.

Section 43 comprises a particular bevel 44 that allows the forks to rotate without hindrance and a square section 45 arranged to lock the fork in a horizontal position, stopped against the horizontal support element 35 of the cradle 4.

The device 1 for loading and unloading goods comprises a power supply system for linear actuators 12, 16, 29, 30 connected by means of a board and hydraulic pipes to a control unit of the trailer tractor or truck. In absence of a control unit, it is possible to provide for installing a self-powered machine directly on board of the trailer tractor or truck.

The power supply system comprises an air/oil system of known type.

The device for loading and unloading goods 1 according to the present invention may take several configurations.

The configuration shown in FIG. 2 is that used for carrying the device. The size occupied is as small as possible. The cradle is arranged to enclose and secure the goods inside.

Wheels of the device do not touch the truck or trailer floor. Cradle corner blocks are arranged to be twist-locked to the floor at least when the device 1 is loaded with goods.

The configuration shown in FIG. 3 allows for greater stability during shifts.

The configuration shown in FIG. 4 allows to move up and down the device from the loading platform or floor of the trailer or truck, or to position the device 1 above the loading and unloading area.

The configuration shown in FIG. 5 allows to move the device forward and back along the direction of the X axis, by means of the secondary frame movement and of the alternate locking of the front and rear wheels.

In the configuration shown in FIG. 6, the cradle is moved by actuators, placed in the support legs and synchronized together. The movement takes place along the axis and allows the increase of the light between the two side walls.

The configuration shown in FIG. 7 allows to correctly position the device above the goods to be transported. In this configuration, the elements for supporting goods are in vertical mode.

The method of loading and unloading goods allows to use various movement combinations of the various moving parts and is always very similar.

For the loading phase, in particular in case of goods on pallets, the pallets are placed in advance in the loading area (square or sloping area).

The device is moved by the action of the actuators so that it is positioned above the loading area.

Once in position, the device moves to the level of the goods to be loaded.

The lateral walls 14 of the cradle protrude from the main frame 2 along the Y axis and the elements 24 for supporting goods, are rotated so as to have a horizontal position.

The lateral walls 14 then extend towards the main frame 2 so as to feed the goods support elements 24 into the pallets arranged to support the goods to be loaded from below.

At this point the device 1, by keeping the cradle 4 in the closed position (the smallest possible distance between the two side walls 14 of the cradle 4) will be moved so as to be positioned above the trailer or truck floor and connected to the floor or loading platform.

The device will then be fully seated on the truck or trailer floor or loading platform in a completely closed configuration and then can be twist-locked and transported by comprising goods inside the device 1.

In case of unloading the goods, goods are already inserted inside the device.

The truck carries the device near the unloading area of the goods. The device is then disconnected from the floor, moved and positioned above the unloading area.

At this point the side walls 14 are extended from the main frame 2 until the goods support elements 24 are removed from the pallets so as to release the goods into the unloading area. Expediently, goods support elements 24 are then rotated vertically to avoid collisions with the goods and the device 1 is moved to return to the truck or trailer floor, and be transported.

It is possible to consider a wide variety of variants by size, capacity and type of use.

In another embodiment of the invention, for example, the device 1 is designed for the transport of non-palletized material, for example, bulkheads, earth, granaries, etc.

In this case, the load compartment will be delimited by closed container walls. The goods support structure 24 will create a bottom wall formed of two parts and openable for releasing the goods.

According to another embodiment of the invention it is possible to directly load and unload containers into the load compartment of the device 1, which has dimensions suitable for transporting the containers themselves.

In practice, the materials used and the dimensions can be any according to the requirements and state of the art.

The invention claimed is:

1. A device for loading and unloading goods, configured to connect to a floor of a trailer or a truck, said device comprising:
    a main support frame comprising a first set of supporting bars and a second set of supporting bars perpendicular to said first set,
    a sub-frame, supported in an adjustable position by said main frame, comprising supports configured to slidably couple to said second set of supporting bars,
    a cradle supported in an adjustable position by said main support frame and defining with the said main support frame a compartment for housing goods, said cradle comprising lateral walls, that delimit said compartment, and lateral wall supports for said lateral walls, said lateral wall supports being slidably coupled to said first set of supporting bars, and
    first actuators configured to move said sub-frame with respect to said main support frame along a first axis or X axis, and second actuators configured to move said cradle with respect to said main support frame along a second axis or Y axis, said first axis and said second axis being perpendicular to each other, said second actuators being configured to adjust the size of said lateral walls along the Y axis with respect to said main support frame so as to modify the configuration of said compartment,
    wherein said lateral walls are configured to delimit a goods storage compartment convertible from at least
    (i) a goods transport configuration arranged for housing said goods to a goods unload configuration, and
    (ii) a goods load configuration to a goods transport configuration arranged for housing said goods,
    and further comprise
    additional lateral wall supports attached to a lower horizontal support element located at the base of said lateral walls, and configured for installation of supporting elements, said supporting elements being configured to support said goods from the bottom, and
    corner blocks installed to the base of said lateral walls of said cradle, said corner blocks being configured to twist-lock the corner blocks to said floor of said trailer or said truck when the device is in the goods transport configuration.

2. The device according to claim 1, wherein said first and second actuators comprise one or more linear actuators.

3. The device according to claim 1, wherein said subframe comprises a front portion formed from tubes that are stacked up and welded together.

4. The device according to claim 3, wherein said first actuators are configured to adjust the size of said front portion along the X axis with respect to said main frame.

5. The device according to claim 1, comprising main supporting legs of a size that is adjustable along the Z axis by the way of at least one third actuator.

6. The device according to claim 5, wherein each one of said legs is sustained by a respective wheel.

7. The device according to claim 5, wherein each one of said legs is independently moved by at least one of said first actuators, said second actuators or said at least one third actuator.

8. The device for loading and unloading goods according to claim 5, wherein said at least one third actuator comprises a linear actuator.

9. The device according to claim 1, wherein said supporting elements comprise a variable number or forks hinged to a corresponding lateral wall and configured to be selectively activated.

10. The device for loading and unloading goods, according to claim 1, wherein each one of said supporting elements alternatively comprise:

a variable number of forks each selectively actuatable, said forks being hinged at the base of the lateral wall, or a bottom container wall formed of two parts, each part being hinged at the base of each of said lateral walls and configured to transport non-palletized material.

11. The device for loading and unloading goods, according to claim 1, wherein each of said lateral walls comprises panels arranged for closing each one of said lateral walls.

12. The device for loading and unloading goods, according to claim 1, wherein said goods storage compartment is arranged to be moved on the ground in any direction when in said goods unload or load configuration.

* * * * *